US010503537B2

(12) United States Patent
Bhandari et al.

(10) Patent No.: US 10,503,537 B2
(45) Date of Patent: Dec. 10, 2019

(54) HYPERVISOR DIRECT MEMORY ACCESS

(71) Applicant: Microsoft Technology Licensing, LLC, Redmond, WA (US)

(72) Inventors: Aditya Bhandari, Seattle, WA (US); Bruce J. Sherwin, Jr., Woodinville, WA (US); Xin David Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

(21) Appl. No.: 15/875,903

(22) Filed: Jan. 19, 2018

(65) Prior Publication Data

US 2019/0087368 A1 Mar. 21, 2019

Related U.S. Application Data

(60) Provisional application No. 62/560,578, filed on Sep. 19, 2017.

(51) Int. Cl.
*G06F 9/455* (2018.01)
*G06F 13/10* (2006.01)
*G06F 12/1081* (2016.01)
*G06F 12/1036* (2016.01)
*G06F 13/42* (2006.01)
*G06F 13/28* (2006.01)
(Continued)

(52) U.S. Cl.
CPC ...... *G06F 9/45558* (2013.01); *G06F 12/1009* (2013.01); *G06F 12/1027* (2013.01); *G06F 12/1036* (2013.01); *G06F 12/1081* (2013.01); *G06F 13/10* (2013.01); *G06F 13/28* (2013.01); *G06F 13/42* (2013.01); *G06F 21/53* (2013.01); *G06F 2009/45566* (2013.01);
(Continued)

(58) Field of Classification Search
CPC .......... G06F 12/02; G06F 12/00; G06F 13/24
See application file for complete search history.

(56) References Cited

U.S. PATENT DOCUMENTS

2012/0017063 A1* 1/2012 Hummel ............ G06F 12/1081
711/200
2012/0023280 A1* 1/2012 Lais .................... G06F 13/28
710/308

(Continued)

FOREIGN PATENT DOCUMENTS

WO    2004066059 A2    8/2004
WO    2015124899 A1    8/2015

OTHER PUBLICATIONS

"International Search Report and Written Opinion Issued in PCT Application No. PCT/US2018/038882", dated Sep. 28, 2018, 11 Pages.

(Continued)

*Primary Examiner* — Getente A Yimer

(57) ABSTRACT

This disclosure generally relates to hypervisor memory virtualization. Techniques disclosed herein improve peripheral component interconnect express (PCI-e) device interoperability with a virtual machine. As an example, when a direct-memory access request is received from a PCI-e device but the target memory is currently unmapped, an indication may be provided to a memory paging processor so as to page-in the memory, such that the PCI-e device may continue to function normally. In some examples, the access request may be buffered and replayed once the memory is paged-in, or the access request may be retried, among other examples.

20 Claims, 12 Drawing Sheets

(51) Int. Cl.
*G06F 12/1027* (2016.01)
*G06F 21/53* (2013.01)
*G06F 12/1009* (2016.01)

(52) U.S. Cl.
CPC .............. *G06F 2009/45579* (2013.01); *G06F 2009/45583* (2013.01); *G06F 2009/45587* (2013.01); *G06F 2212/152* (2013.01); *G06F 2212/206* (2013.01); *G06F 2212/303* (2013.01); *G06F 2212/65* (2013.01); *G06F 2212/651* (2013.01); *G06F 2212/68* (2013.01); *G06F 2212/682* (2013.01); *G06F 2212/683* (2013.01); *G06F 2213/0026* (2013.01); *G06F 2221/2149* (2013.01)

(56) References Cited

U.S. PATENT DOCUMENTS

| | | | |
|---|---|---|---|
| 2012/0086815 A1* | 4/2012 | Cooper | H04N 7/15 348/207.1 |
| 2014/0165217 A1* | 6/2014 | Carvounas | G06F 21/445 726/30 |
| 2014/0282501 A1 | 9/2014 | Zeng et al. | |
| 2014/0298061 A1* | 10/2014 | Volvovski | G06F 3/0625 713/323 |
| 2015/0121163 A1* | 4/2015 | Ghodsi | G06F 12/0802 714/754 |
| 2015/0370591 A1 | 12/2015 | Tuch et al. | |
| 2016/0077976 A1 | 3/2016 | Raikin et al. | |
| 2016/0140047 A1 | 5/2016 | Mukherjee et al. | |

OTHER PUBLICATIONS

"International Search Report and Written Opinion Issued in PCT Application No. PCT/US2018/038889", dated Oct. 5, 2018, 11 Pages.

"International Search Report and Written Opinion Issued in PCT Application No. PCT/US2018/038890", dated Oct. 4, 2018, 11 Pages.

* cited by examiner

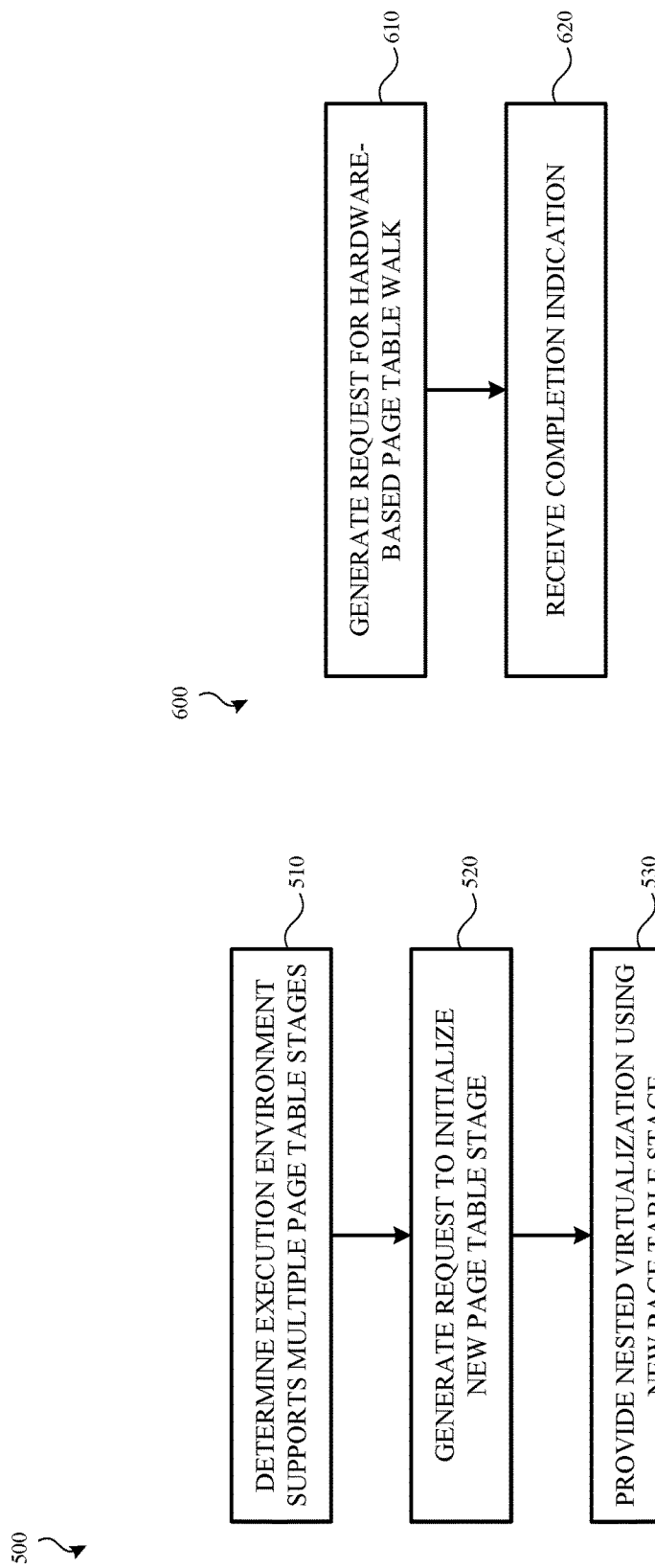

HYPERVISOR DIRECT MEMORY ACCESS

CROSS-REFERENCE TO RELATED APPLICATION

This application claims priority to U.S. Provisional Application No. 62/560,578, entitled "Hypervisor Memory Virtualization," filed on Sep. 19, 2017, the entire disclosure of which is hereby incorporated by reference in its entirety.

BACKGROUND

In a virtualization environment, a hypervisor may manage memory of a host machine in order to provide memory to one or more virtualized guests. However, a variety of use cases may complicate memory management, including, but not limited to, virtualization environments comprising nested virtualized guests, managing virtualization workloads across multiple processors, and facilitating virtual machine interactions with peripheral component interconnect express (PCI-e) devices.

It is with respect to these and other general considerations that examples have been described. Also, although relatively specific problems have been discussed, it should be understood that the examples should not be limited to solving the specific problems identified in the background.

SUMMARY

This disclosure generally relates to hypervisor memory virtualization. Techniques disclosed herein improve peripheral component interconnect express (PCI-e) device interoperability with a virtual machine, generate multiple page table stages for increased performance in nested virtualization scenarios, and provide more efficient translation lookaside buffer (TLB) invalidation requests and page table handling so as to reduce processing overhead.

When a direct-memory access request is received from a PCI-e device but the target memory is currently unmapped, an indication may be provided to a memory paging processor so as to page-in the memory, such that the PCI-e device may continue to function normally. In an example, the access request may be buffered and replayed once the memory is paged-in, or the access request may be retried, among other examples.

Multiple page table stages may be used to provide page tables that may be used by a processor when processing a workload for a nested virtual machine. An intermediate (e.g., nested) hypervisor may request an additional page table stage from a parent hypervisor, which may be used to virtualize memory for one or more nested virtual machines managed by the intermediate hypervisor. Accordingly, a processor may use the additional page table stage to ultimately translate a virtual memory address to a physical memory address.

TLB invalidation requests may be selectively delivered to processors to which they relate or may be ignored by processors to which they do not relate, so as to minimize the processing overhead that may be ordinarily associated with such TLB invalidation requests. In another example, a TLB invalidation request may be suspended in order to enable a hypervisor to finish executing instructions relating to one or more TLB entries that would be affected by the TLB invalidation request.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 5 illustrates an example method for utilizing multiple page table stages in a nested virtualization environment.

FIG. 6 illustrates an example method for requesting a hardware-based page table walk.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In some examples, a peripheral component interconnect express (PCI-e) device may be used by a virtual machine, wherein the PCI-e device may attempt to access memory of the virtual machine using direct memory access. However, the requested memory may not be currently available in system memory (e.g., as a result of memory paging techniques), such that the memory access request may fail. As such, aspects disclosed herein relate to providing an indication to a memory paging processor when a direct-memory access request is received from a PCI-e device. Thus, the memory paging processor may page-in the memory, such that the PCI-e device may continue to function normally. In an example, the access request may be buffered and replayed once the memory is paged-in, or the access request may be retried, among other examples.

Figure 1:
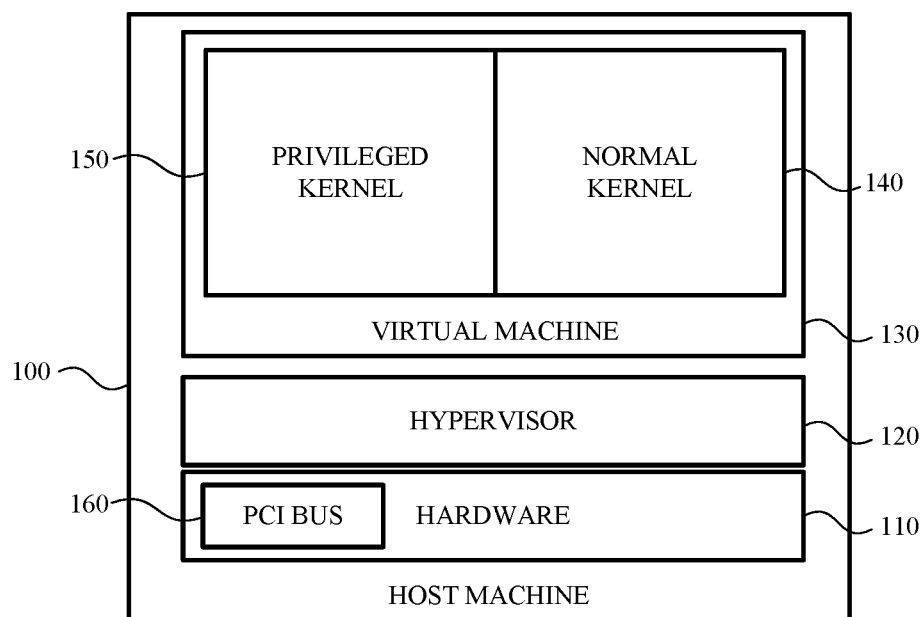
FIG. 1 illustrates an example host machine on which aspects disclosed herein may be practiced.

FIG. 1 illustrates an example host machine 100 on which aspects disclosed herein may be practiced. In some implementations, the host machine 100 may be any computing device capable of launching one or more virtual machines, such as, for example, virtual machine 130. The host machine 100 may be a desktop computer, a laptop computer, a mobile computing device, a tablet computing device, a wearable computing device, a gaming device and so on.

As shown in FIG. 1, the host machine 100 may include hardware 110. The hardware 110 may include one or more processors, one or more storage devices, one or more memory devices and so on. As illustrated, the hardware 110 comprises a PCI (peripheral component interconnect) bus 160, which may be used to connect any of a variety of PCI-e devices (e.g., PCI-e expansion cards, PCI-e storage controllers, etc.). In an example, the PCI bus 160 may be used to share a PCI-e device with one or more virtual machines, such as the virtual machine 130. In examples, the hardware 110 may comprise an input-output memory management unit (IOMMU), which may enable a direct-memory access (DMA) capable device to access memory of the hardware 110.

In the example shown in FIG. 1, the host machine 100 also includes a hypervisor 120. In some cases, the hypervisor 120 may be software, hardware, firmware or a combination thereof. As will be explained in more detail below, the hypervisor 120 is configured to create, run and/or manage one or more virtual machines 130. In some examples, the virtual machine 130 may interact with a PCI-e device via the PCI bus 160. In an example, memory made available to the virtual machine 130 by the hypervisor 120 may be provided using memory paging techniques, wherein at least a part of the memory used by or available to the virtual machine 130 may not always reside in the main system memory of the host machine 100. Rather, the hypervisor 120 may page memory in and out of system memory when the memory is used by the virtual machine 130, which may enable more memory to be available to the virtual machine 130 than is actually physically available from the hardware 110. However, traditionally, if a PCI-e device connected to the virtual machine 130 attempts to make a DMA request for memory virtualized by the hypervisor 120, the memory may not be concurrently stored in the main system memory, thereby causing the request to fail. As such, according to aspects disclosed herein, memory may be paged back in when access to unmapped memory is attempted by a PCI-e device, thereby improving virtualized PCI-e device functionality.

In the example shown in FIG. 1, the hypervisor 120 is configured to communicate directly with the hardware 110 of the host machine 100. In such cases, the hypervisor 120 may be viewed as having the highest privilege level among the various other software, firmware and/or other hardware components of the host machine 100. Thus, for example, when the host machine 100 boots up, the hypervisor 120 may be the first item or component that is created, instantiated or otherwise executed on the host machine 100.

Once the hypervisor 120 is initialized, it may create one or more virtual machines 130. Each virtual machine 130 may emulate a computer system and, as such, may provide the functionality of a physical computing device. In some examples, the virtual machine 130 may include a privileged kernel 150 and a normal kernel 140.

The privileged kernel 150 may be configured to execute a secure operating system. As such, the privileged kernel 150 can run one or more secure programs that contain various secretes utilized by the virtual machine 130, the hypervisor 120, and/or the normal kernel 140. For example, the privileged kernel 150 may store various credentials, encryption keys and the like.

The normal kernel 140 may be configured to execute various "normal" programs and applications, such as, for example, word processing applications, browser applications, spreadsheet applications and so on. However, due to the less secure security configuration (e.g., when compared to the security configuration of the privileged kernel 150) of the normal kernel 140, the normal kernel 140 may not store any credentials, encryption keys, or other secrets that may be utilized by the virtual machine 130 and/or the hypervisor 120. As such, when various secrets are needed by the various applications running on the normal kernel 140, the normal kernel 140 may request those secrets from the privileged kernel 150. In another implementation, the normal kernel 140 may request that the privileged kernel 150 perform one or more actions, using one or more of the stored secrets, on behalf of the normal kernel 140 and/or one or more applications executing on the normal kernel.

In some instances and due to the hypervisor 120 executing both the privileged kernel 150 and the normal kernel 140, the hypervisor 120 may execute in a privileged context. The privileged context enables the hypervisor 120 to switch between the privileged kernel 150 and the normal kernel 140 and/or various user modes.

As the hypervisor 120 is responsible for various virtual machines 130 and each virtual machine's respective kernels, it is important that the hypervisor 120 be one of the most, if not the most secure component on the host machine 100. For example, if the hypervisor 120 is software, the hypervisor 120 may have the highest privilege level when compared to other software that may be executing on the host machine 100. In some cases, the hardware 110 provides the hypervisor 120 with privilege level architecture that enables the hypervisor 120 to run and to exert authority over every virtual machine 130 the hypervisor 120 creates. As will be explained in more detail below with respect to FIG. 3A, the host machine 100 may include nested hypervisors. In such cases, the primary hypervisor may have authority over the secondary hypervisor.

In some examples, the hardware 110 may comprise a translation lookaside buffer (TLB), which may be used to cache information from a page table, wherein the page table may be used translate virtual memory addresses to physical memory addresses when using memory paging techniques. Thus, when one or more processors of the hardware 110 is processing a workload for a virtual processor used by the virtual machine 130, the TLB may be used in order to expedite memory access. However, an entry in the TLB may become "stale" (e.g., outdated, incorrect, etc.) if information in the page table changes. As a result, an invalidation request may be provided to the processors in order to invalidate the stale TLB entry. In some examples, the TLB invalidation request may be provided to only the processors of the hardware 110 that processed the workload or, in other examples, the TLB invalidation request may be ignored or otherwise filtered by processors that did not process the workload.

In another example, the virtual machine 130 may generate an invalidation request for a TLB entry. However, if the hypervisor 120 is currently using the entry (e.g., as part of one or more virtualization instructions), invalidating the TLB entry may cause unexpected or undesired behavior. Thus, according to aspects disclosed herein, the TLB invalidation request may be suspended so as to enable the hypervisor 120 to complete its processing, after which the TLB invalidation request may be resumed.

Figure 2:
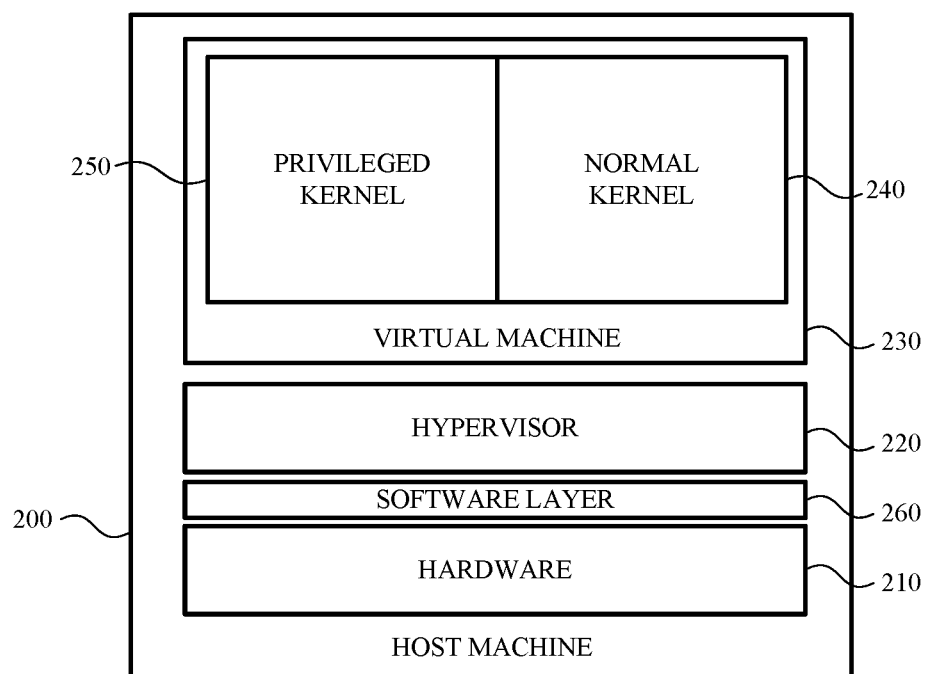
FIG. 2 illustrates another example host machine on which a software layer exists between the hypervisor and the hardware of the host machine according to an example.

FIG. 2 illustrates another example host machine 200 on which a software layer 260 exists between the hypervisor 220 and the hardware 210 of the host machine 200 according to an example. In this example, the hardware 210, the hypervisor 220 and virtual machine 230, the normal kernel 240 and the privileged kernel 250 may function in a similar manner such as was described above with respect to FIG. 1. Further, the hardware 210 may comprise a PCI bus similar to the PCI bus 160 described above with respect to FIG. 1. However, in this example, the host machine 200 includes a software layer 260 positioned between the hypervisor 220 and the hardware 210.

In some cases, the software layer 260 may be responsible for certain aspects of the hardware 210. For example, the software layer 260 may be responsible for putting the host machine 200 in a sleep state, resuming programs or applications when the host machine 200 awakens from a sleep state and so on.

It is also possible that the software layer 260 has a higher privilege level than the hypervisor 220. In such cases, the hypervisor 220 should be configured to communicate directly with the software layer 260. That is, any communication between the software layer 260 and any of the other components (e.g., the privileged kernel 250, the normal kernel 240 etc.) of the host machine 200 should be routed or otherwise mediated through the hypervisor 220. For example, any communication that occurs between the normal kernel 240 and the software layer 260 should be handled by the hypervisor 220.

In some cases when the software layer 260 is present, it may be desirable for the hypervisor 220 to be able to turn off or deactivate the software layer 260. For example, once the hypervisor 220 has been initialized, the hypervisor 220 may be configured to turn off the software layer 260, suspend operations performed by the software layer 260, intercept commands provided by or sent to the software layer 260 and so on. In this way, the hypervisor 220 may have the highest privilege level within the host machine 200. As such, security features of the host machine 200 may be improved as the hypervisor 220 controls communications between the various components of the host machine 200. As will also be described below, the host machine 200 may be able to determine that the hypervisor 220 was securely launched thereby preventing any attacks that may be brought to the host machine 200.

Figure 3A:
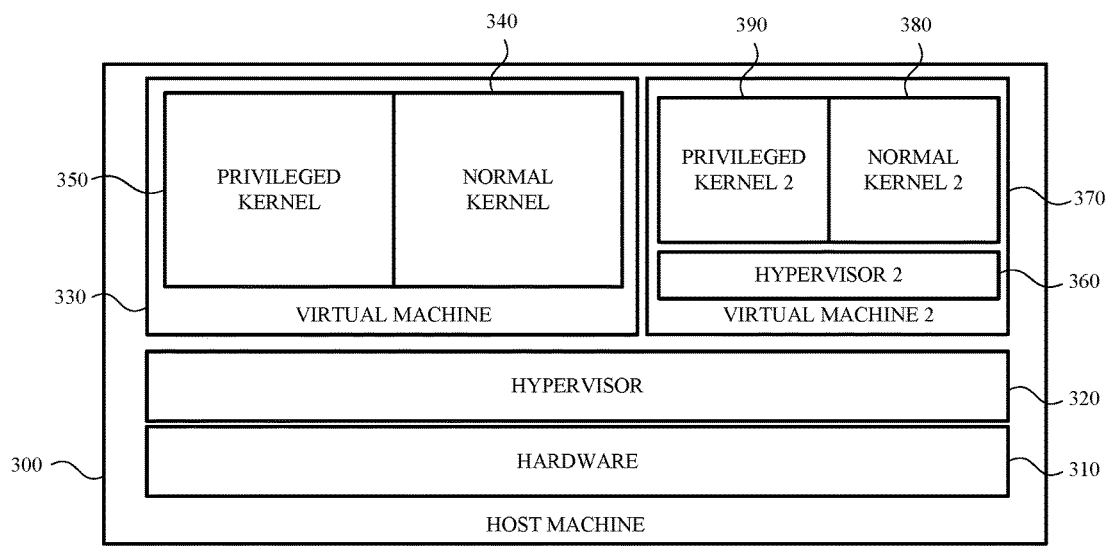
FIG. 3A illustrates an example host machine having nested hypervisors that support nested virtualization according to an example.

FIG. 3A illustrates an example host machine 300 having nested hypervisors that support nested virtualization according to an example. As shown in FIG. 3A, the host machine 300 may include hardware 310 and a hypervisor 320. In some cases, the hardware 310 and the hypervisor 320 may function in a similar manner such as described above. For example, the hypervisor 320 may communicate with the hardware 310 as well as with a normal kernel 340 and a privileged kernel 350 of a virtual machine 330. Further, hardware 310 may comprise a PCI bus similar to the PCI bus 160 in FIG. 1.

Additionally, the hypervisor 320, and/or the hardware 310, may be able to create, run, and/or command another virtual machine (shown in FIG. 3A as virtual machine 2 370) and another hypervisor (shown in FIG. 3A as hypervisor 2 360). As with the virtual machine 330, the virtual machine 2 370 may include a privileged kernel (shown in FIG. 3A as privileged kernel 2 390) and a normal kernel (shown in FIG. 3A as normal kernel 2 380). Each of these kernels may function in a similar manner to the normal kernel 140 and the privileged kernel 150 described above.

Figure 3B:
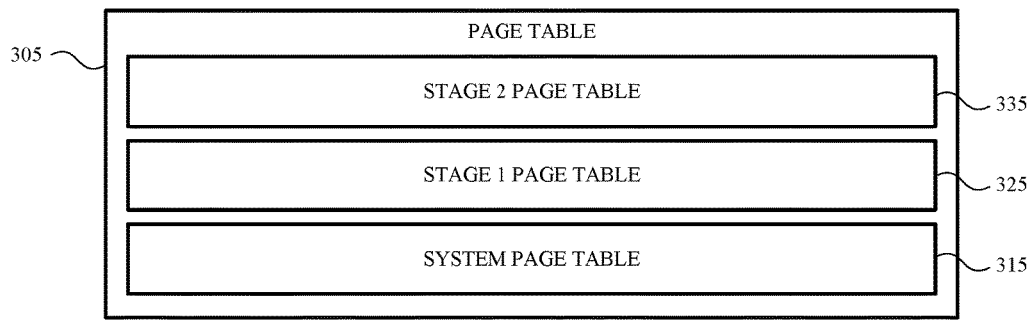
FIG. 3B illustrates an example page table having multiple translation stages according to aspects disclosed herein.

The host machine 300 may comprise two virtualization layers, the first of which is comprised of the virtual machine 330 and the virtual machine 2 370, and the second of which is comprised of the hypervisor 2 360. With reference now also to FIG. 3B, which illustrates an example page table 305 with multiple translation stages 315, 325 and 335. According to aspects disclosed herein, the page table 305 may be used to provide improved memory performance. As an example, the system page table 315 may map system virtual memory addresses to system physical memory addresses (e.g., as may be utilized by the hypervisor 320). Further, a subsequent page table stage, illustrated as the stage 1 page table 325, may be used to map guest virtual memory addresses to system virtual memory addresses (e.g., as may be utilized by the virtual machine 330 and/or the virtual machine 2 370). Thus, when translating a virtual memory address for the virtual machine 330, a processor of the hardware 310 may access the stage 1 page table 325 to identify a system virtual memory address, and may subsequently access the system page table 315 using the system virtual memory address to identify a system physical memory address.

Similarly, the stage 2 page table 335 may be used to map virtual memory addresses for the hypervisor 2 360 (e.g., executing privileged kernel 2 390 and normal kernel 2 380) to virtual memory addresses stored by the stage 1 page table 325. As a result, a processor of the hardware 310 may access the stage 2 page table 335 to translate a virtual memory address used by the hypervisor 2 360 to a virtual memory address in the stage 1 page table 325, which may in turn be translated based on the stage 1 page table 325 to a system virtual memory address. The system virtual memory address may then ultimately be translated to a system physical memory address using the system page table 315. Thus, the page table 305 may provide performance improvements as compared to traditional solutions, as a result of offering a configurable number of translation stages for use by nested virtualization layers.

The hypervisor 2 360 may communicate with and run the privileged kernel 2 390 and the normal kernel 2 380 in a similar manner as described above. For example, the hypervisor 2 360 may run in a privileged context, which enables the hypervisor 2 360 to switch between the privileged kernel 2 390 and the normal kernel 2 380. The hypervisor 2 360 may believe that it is the only hypervisor in the host machine 300. However, the hypervisor 2 360 may be subject to and commanded by the hypervisor 320. That is, any communications between the hypervisor 2 360 and the hardware 310 may be passed through the hypervisor 320.

Although not shown in FIG. 3A, the host machine 300 may also include a software layer, such as, for example, software layer 260 (FIG. 2). When the software layer is present, the hypervisor 2 360 should only be configured to communicate the hypervisor 320. In some cases, the hypervisor 2 360 will not be launched until a verification is received that the hypervisor 320 has been launched securely.

Figure 4:
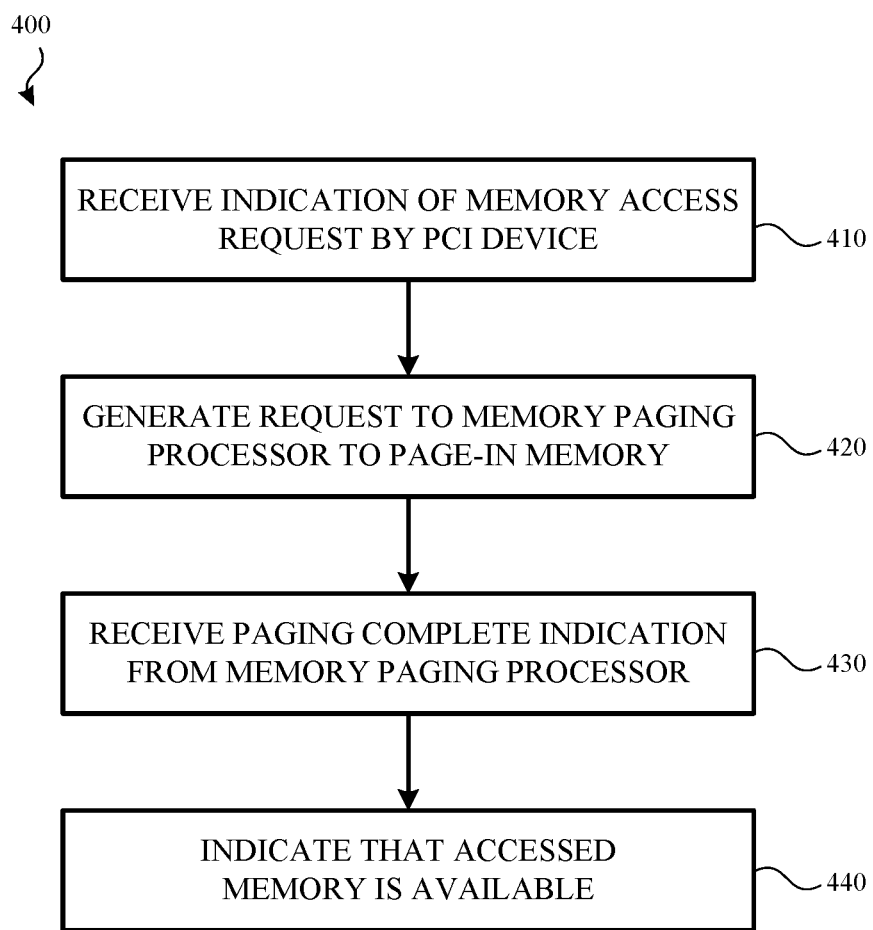
FIG. 4 illustrates an example method for managing virtualized memory accessed by a peripheral component interconnect device according to aspects disclosed herein.

FIG. 4 illustrates an example method 400 for managing virtualized memory accessed by a PCI-e device according to aspects disclosed herein. In some cases, the method 400 may be used by a host system, such as, for example, host system 100 (FIG. 1), host system 200 (FIG. 2), and/or host system 300 (FIG. 3).

Method 400 begins at operation 410, where an indication of memory access by a PCI-e device may be received. In an example, the indication may be received at a hypervisor. The indication may be provided by an IOMMU, a processor, or other component of a host machine. In some examples, the indication may be received when the PCI-e device requests access to system memory (e.g., via DMA) or when it is determined that the requested memory is unmapped (e.g. which may result in a fault at the PCI-e device), among other examples. In an example, the indication may be received as a result of "buffering" a memory access request, such that the memory access request may later be replayed. In another example, the request may be paused, such that it may be later resumed.

Flow progresses to operation 420, where a request to page-in memory may be generated and provided to a memory paging processor. In an example, the request may comprise an indication as to a memory address that was requested by the PCI-e device. In some examples, the memory address may be a physical memory address or a virtual memory address. In another example, the memory paging processor may be part of a processor, provided by the hypervisor, or a combination thereof, among other examples.

At operation 430, a paging complete indication may be received from the memory paging processor. The paging complete indication may be received as a result of the memory paging processor successfully paging-in the requested memory, and may therefore indicate that one or more requested memory pages are available in system memory. As a result of receiving the paging complete indication, flow progresses to operation 440, where it may be indicated that the accessed memory is available. In an example, this may result in replaying a buffered memory access request, resuming the access request, or providing an indication to the IOMMU, PCI bus, and/or the PCI-e device that the request may be retried. In another example, the PCI-e device may retry after a period of time. In some examples, buffering the request may provide improved compatibility with PCI-e devices, as such an example may appear to the PCI-e device as a slow transaction rather than a failed request. Flow terminates at operation 440. It will be appreciated that while example indications and interactions are described herein, alternative techniques may be used to identify a request for unmapped memory and/or to provide an indication that the memory is now available, etc.

FIG. 5 illustrates an example method 500 for utilizing multiple page table stages in a nested virtualization environment. In some cases, the method 500 may be used by a hypervisor or a virtual machine, such as, for example, hypervisor 110, virtual machine 130 (FIG. 1), virtual machine 230 (FIG. 2), virtual machine 330, virtual machine 2 370, and/or hypervisor 2 360 (FIG. 3).

Method 500 begins at operation 510, where it may be determined that the execution environment supports page tables having multiple or a variable number of stages. In some examples, the execution environment may comprise aspects of a host machine and/or aspects of a virtual machine. In an example, determining that nested page tables are supported may comprise evaluating a register, such that nested page table functionality may be toggled or selectively provided to virtualized guests of a host machine. In another example, the determination may comprise evaluating hardware capabilities, such as the capabilities of one or more physical and/or virtual processors.

At operation 520, a request may be generated to initialize a new page table stage. As an example, the new page table stage may be similar to the stage 1 page table 325 and/or the stage 2 page table 335, as was discussed above with respect to FIG. 3A. In an example, the request may be provided to an intermediate hypervisor (e.g., the hypervisor 2 360 in relation to the hypervisor 320 in FIG. 3A) or to a root hypervisor (e.g., the hypervisor 320 in FIG. 3A). For example, an intermediate hypervisor (e.g., the hypervisor 2 360 in FIG. 3A) may provide the request to a root hypervisor (e.g., the hypervisor 320 in FIG. 3A) so as to provide such page table functionality to virtualized software (e.g., the privileged kernel 2 390 and the normal kernel 2 380 in FIG. 3A) that may be virtualized by the intermediate hypervisor.

Flow progresses to operation 530, where nested virtualization may be provided using the new page table stage. Continuing with the intermediate hypervisor example from above, the intermediate hypervisor may launch and manage a virtual machine, which may execute a workload. Similar to the example discussed above with respect to FIG. 3B comprising multiple stages, the new page table stage may be a second stage page table such as stage 2 page table 335. Thus, a processor processing the workload may use the new page table stage to translate a virtual memory address of the virtual machine to a virtual memory address for the subsequent translation stage (e.g., as may be stored by a page table similar to the stage 1 page table 325). Ultimately, the processor may determine a physical memory address, which may be used to access the physical memory content. In examples, hardware-based support for such page table stages may provide performance improvements as compared to purely software-based solutions (e.g., intercepting requests and providing a shadow page table at a hypervisor, etc.). Flow terminates at operation 530. While examples are described with respect to a certain number of stages, it will be appreciated that any number of stages may be used according to aspects disclosed herein.

FIG. 6 illustrates an example method 600 for requesting a hardware-based page table walk. In some cases, the method 600 may be used by a host system, such as, for example, host system 100 (FIG. 1), host system 200 (FIG. 2), and/or host system 300 (FIG. 3).

Method 600 begins at operation 610, where a request may be generated for a hardware-based page table walk. In an example, the request may be generated by a hypervisor as an alternative or in addition to performing a software-based page table walk. In an example, the hypervisor may request a hardware-based page table walk in order to reduce the amount of processing time that may ordinarily be required when performing a similar task in software. In another example, a hardware-based page table walk may be used in lieu of a software-based operation in order to limit the complexity of the instructions used by the hypervisor. In an example, the request may comprise configuration information such as one or more permission and/or execution bits to observe and/or set when walking the page table, or may comprise an indication regarding the number of page table stages to walk and/or a specific list of page table stages, among other information. Generating the request may comprise providing the request to a processor or other component of a host machine.

At operation 620, a completion indication may be received. In an example, the completion indication may comprise information relating to the page table (e.g., one or more translations, a status for setting information in the page table, etc.). The completion indication may be used by the hypervisor to continue processing, as may ordinarily be performed as a result of performing a software-based page table walk. Flow terminates at operation 620.

Figure 7:
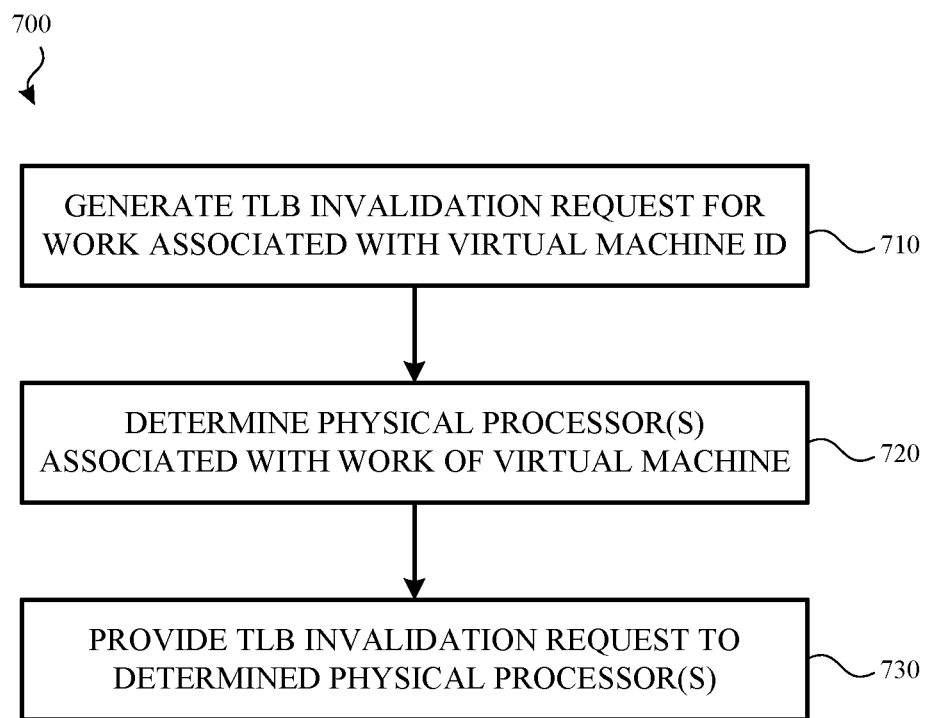
FIG. 7 illustrates an example method for selectively invalidating the content of a translation lookaside buffer.

FIG. 7 illustrates an example method 700 for selectively invalidating the content of a TLB. In some cases, the method 700 may be used by a host system, such as, for example, host system 100 (FIG. 1), host system 200 (FIG. 2), and/or host system 300 (FIG. 3).

Method 700 begins at operation 710, where a TLB invalidation request may be generated for a workload associated with a virtual machine identifier. In an example, the virtual machine identifier may comprise a unique identifier, a host machine identifier, or an identifier associated with one or more physical processors, among other identifiers. In an example, the TLB invalidation request may be generated as a result of determining that information in a page table has changed, thereby rendering one or more entries in the TLB stale. In an example, the TLB invalidation request may be generated by a hypervisor that manages a virtual machine associated with the virtual machine identifier.

At operation 720, one or more physical processors associated with the workload of the virtual machine may be determined. In an example, the determination may be made by a hypervisor, as a result of the hypervisor scheduling work of the virtual processor on the one or more of physical processors. Thus, the hypervisor may be able to determine (e.g., as a result of configuration information, maintaining tracking information, etc.) which physical processor(s) processed the workload for the virtual machine. As an example, a bitmap relating to one or more physical processors may be maintained (e.g., in a register, in system memory, etc.), such that the bitmap may be updated based on which physical processors are used to process workloads for a virtual machine. Accordingly, the bitmap may be used to determine which physical processors should receive a TLB invalidation request.

Flow progresses to operation 730, where the TLB invalidation request may be provided to the determined processor(s). In an example, providing the TLB invalidation request may comprise communicating the request using a bus used by at least the one or more processors, or communicating the invalidation request to each of the determined processors individually. Thus, in an example, processors that were not determined to be associated with the workload of the virtual machine may not receive the invalidation request. In another example, the invalidation request may be broadcast, such that the processors that were not determined to be associated with the workload of the virtual machine may ignore the request as a result of determining that the request is not relevant. As a result, one or more processors that are not subject to the invalidation request may not need to spend processing cycles processing irrelevant TLB invalidation requests, thereby reducing the processing impact that may otherwise have previously occurred. Flow terminates at operation 730.

Figure 8:
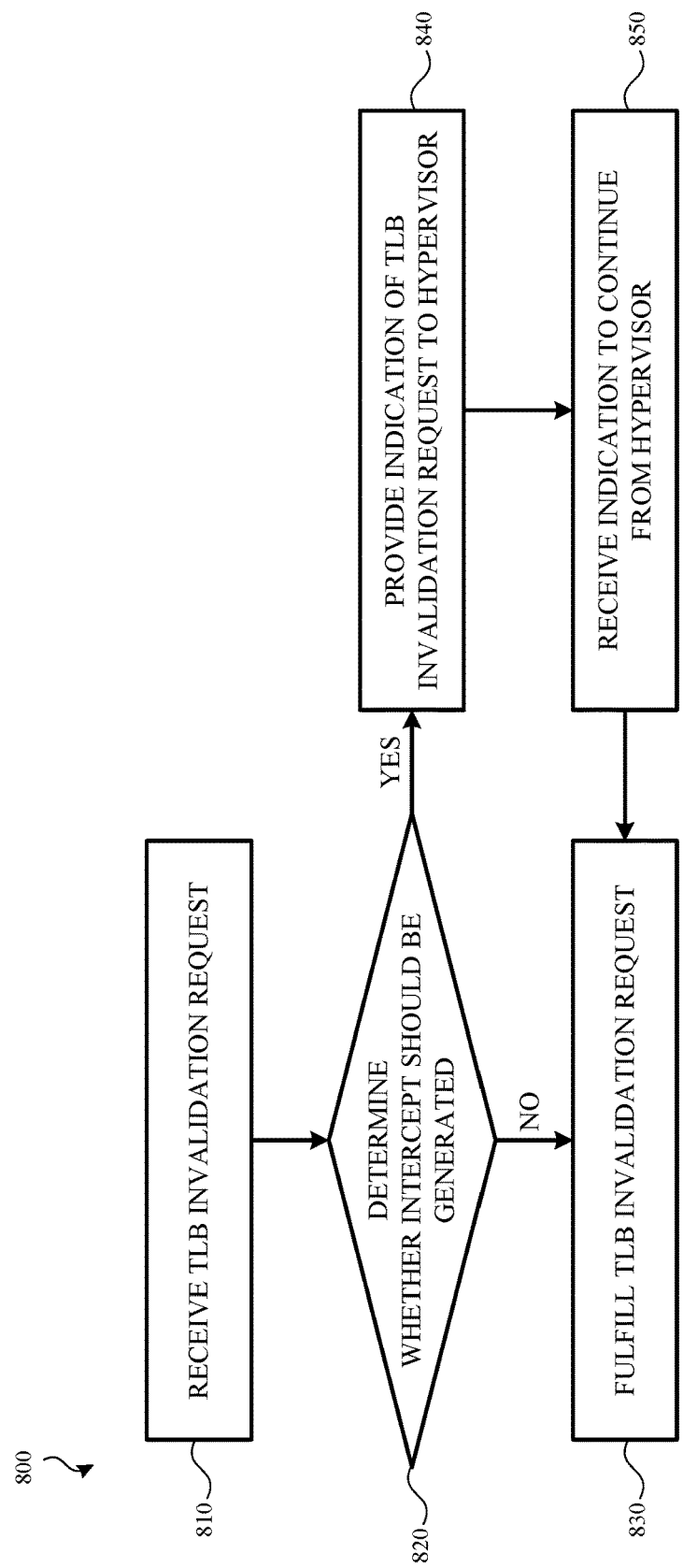
FIG. 8 illustrates an example method for temporarily suspending a translation lookaside buffer invalidation request.

FIG. 8 illustrates an example method 800 for temporarily suspending a TLB invalidation request. In some cases, the method 800 may be used by a host system, such as, for example, host system 100 (FIG. 1), host system 200 (FIG. 2), and/or host system 300 (FIG. 3). In an example, method 800 may be performed so as to enable a hypervisor to finish processing instructions that rely on information otherwise subject to the TLB invalidation request.

Method 800 begins at operation 810, where a TLB invalidation request may be received. In an example, the TLB invalidation request may be received by a processor from a virtual machine. The TLB invalidation request may specify a virtual address and/or a physical address associated with information that should be flushed and invalidated within the TLB.

Flow progresses to determination 820, where it may be determined whether an intercept should be generated. The determination may comprise evaluating a register, which may have been previously set by a hypervisor so as to indicate that an intercept should be generated when a TLB invalidation request is received. In an example, the hypervisor may have indicated a specific virtual machine (e.g., via a virtual machine identifier) for which intercepts should be generated, such that the determination may comprise an evaluation of the source of the TLB invalidation request. While example determination factors are described herein, it will be appreciated that additional or alternative factors may be evaluated.

If it is determined that an intercept should not be generated, flow branches "NO" to operation 830, where the TLB invalidation request may be fulfilled. In an example, fulfilling the TLB invalidation request may comprise identifying one or more entries specified by the invalidation request, and subsequently flushing and/or invalidating them. In another example, the request may cause the entire TLB to be flushed and/or invalidated. Flow terminates at operation 830.

If, however, it is determined that an intercept should be generated, flow branches "YES" to operation 840, where an indication of the invalidation request may be provided to the hypervisor. In an example, the indication may be provided to a physical processor that sent the TLB invalidation request. In another example, the TLB invalidation request may be suspended, such that the request may not yet be fulfilled. The indication may comprise information relating to the TLB invalidation request, such as which entries are affected and/or identifying information relating to the requestor (e.g., a virtual machine identifier, etc.). The hypervisor may perform a variety of operations, such as completing one or more instructions associated with the affected TLB entries.

At operation 850, an indication to continue may be received from the hypervisor, such that flow may then progress to operation 830, where the TLB invalidation request may be fulfilled as was discussed above. As a result, it may be possible for a virtual machine to issue TLB invalidation requests as it would in an ordinary environment (e.g., without virtualization), while permitting the hypervisor to finish processing instructions that rely on entries affected by the TLB invalidation request. Flow terminates at operation 830. While method 800 is discussed as an example wherein the hypervisor is notified of a TLB invalidation request prior to the request being fulfilled, it will be appreciated that other examples may notify the hypervisor during or after request fulfillment.

FIG. 9-FIG. 12 and their associated descriptions provide a discussion of a variety of operating environments in which aspects of the disclosure may be practiced. However, the devices and systems illustrated and discussed with respect to FIG. 9-FIG. 12 are for purposes of example and illustration and are not limiting of a vast number of electronic device configurations that may be utilized for practicing aspects of the disclosure, as described herein.

Figure 9:
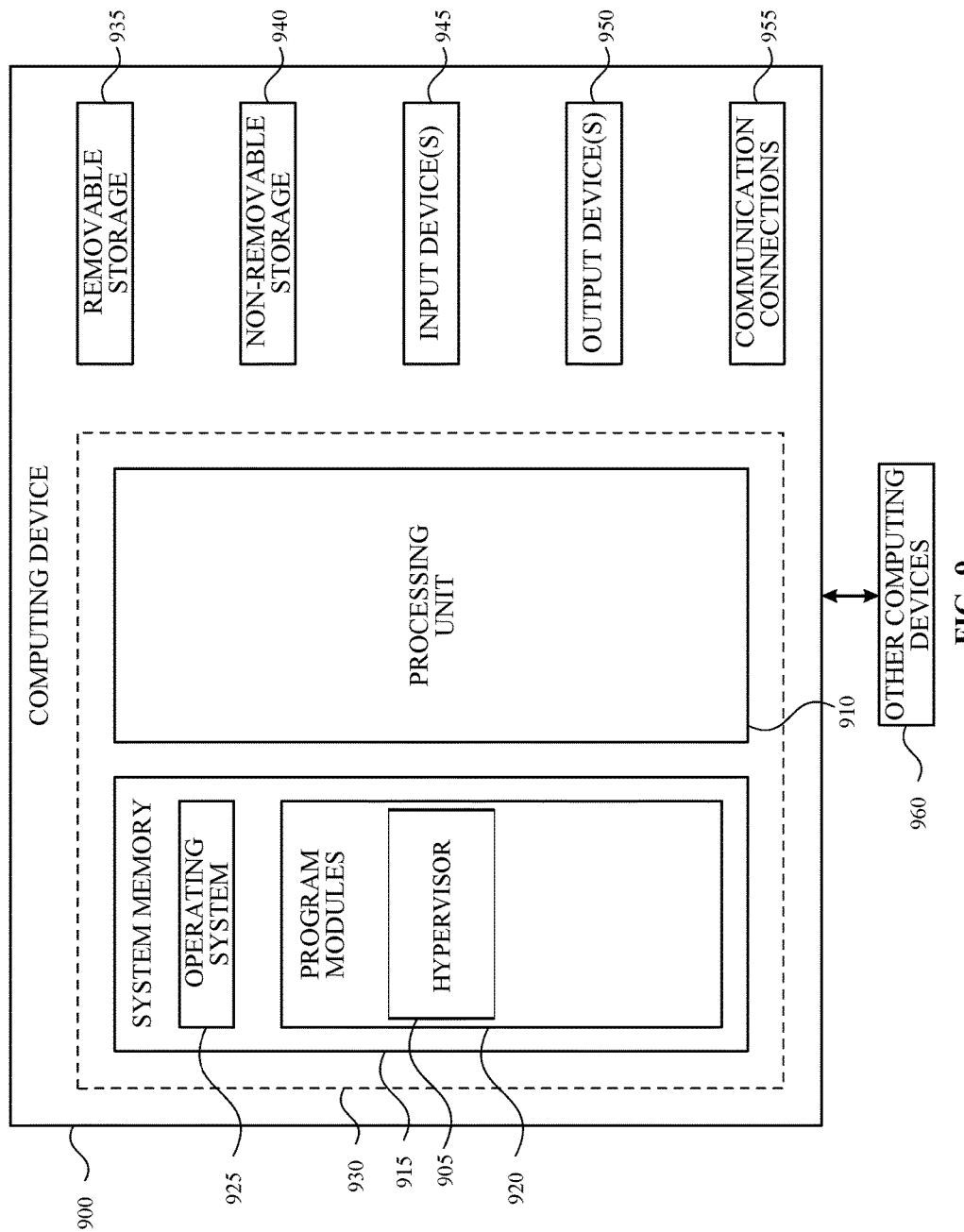
FIG. 9 is a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device 900 may be similar to the host machine 100 described above with respect to FIG. 1.

In a basic configuration, the computing device 900 may include at least one processing unit 910 and a system memory 915. Depending on the configuration and type of computing device 900, the system memory 915 may comprise, but is not limited to, volatile storage (e.g., random access memory), non-volatile storage (e.g., read-only memory), flash memory, or any combination of such memories. The system memory 915 may include an operating system 925 and one or more program modules 920 or components suitable for identifying various objects contained within captured images such as described herein.

The operating system 925, for example, may be suitable for controlling the operation of the computing device 900. Furthermore, examples of the disclosure may be practiced in conjunction with a graphics library, other operating systems, or any other application program and is not limited to any particular application or system. This basic configuration is illustrated in FIG. 9 by those components within a dashed line 930.

The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 935 and a non-removable storage device 940.

As stated above, a number of program modules and data files may be stored in the system memory 915. While executing on the processing unit 910, the program modules 920 (e.g., a hypervisor 905) may perform processes including, but not limited to, the aspects, as described herein.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the computing device 900 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general purpose computer or in any other circuits or systems.

The computing device 900 may also have one or more input device(s) 945 such as a keyboard, a trackpad, a mouse, a pen, a sound or voice input device, a touch, force and/or swipe input device, etc. The output device(s) 950 such as a display, speakers, a printer, etc. may also be included. The aforementioned devices are examples and others may be used. The electronic device 900 may include one or more communication connections 955 allowing communications with other computing devices 960. Examples of suitable communication connections 955 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 915, the removable storage device 935, and the non-removable storage device 940 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
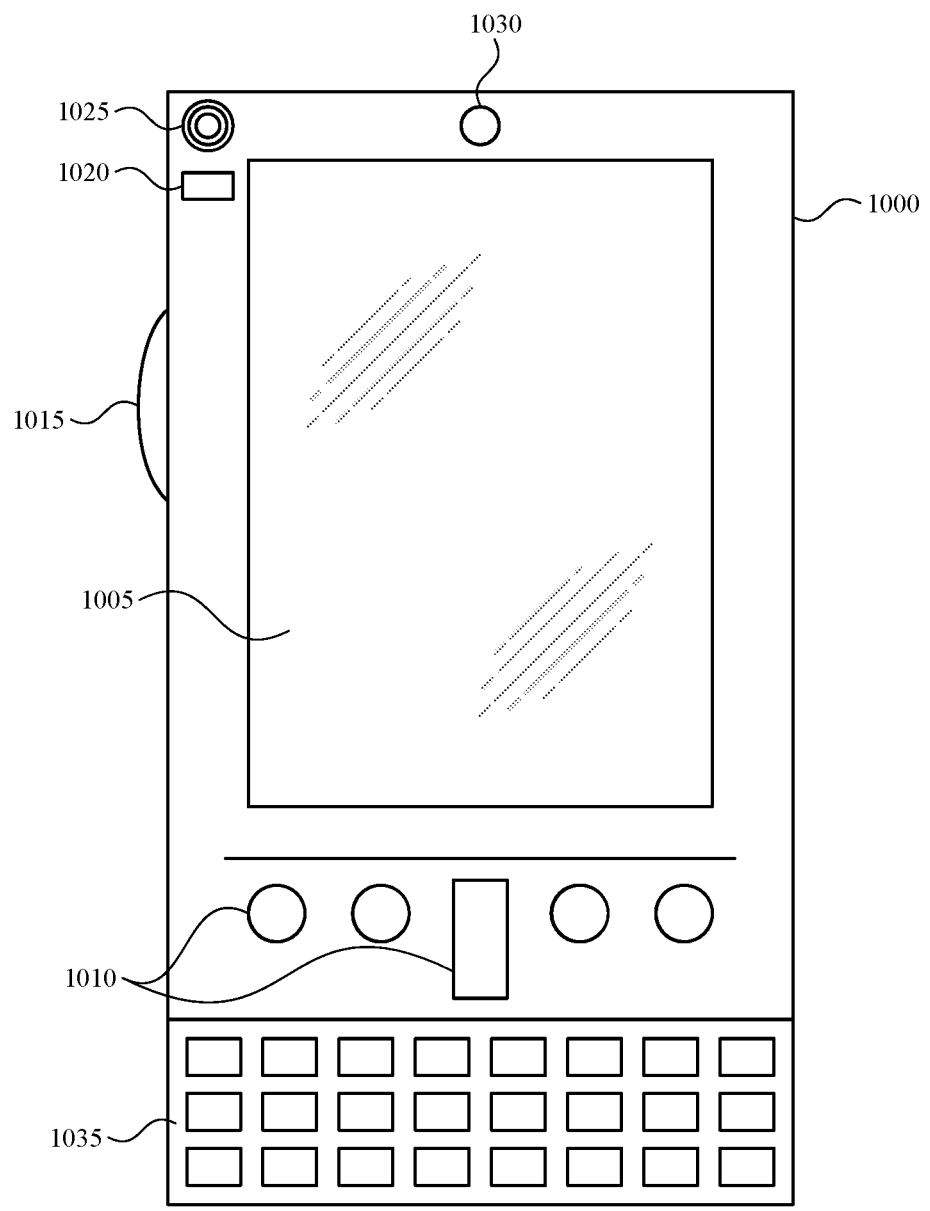
FIGS. 10A and 10B are simplified block diagrams of a mobile computing device with which aspects of the present disclosure may be practiced.
Figure 10B:
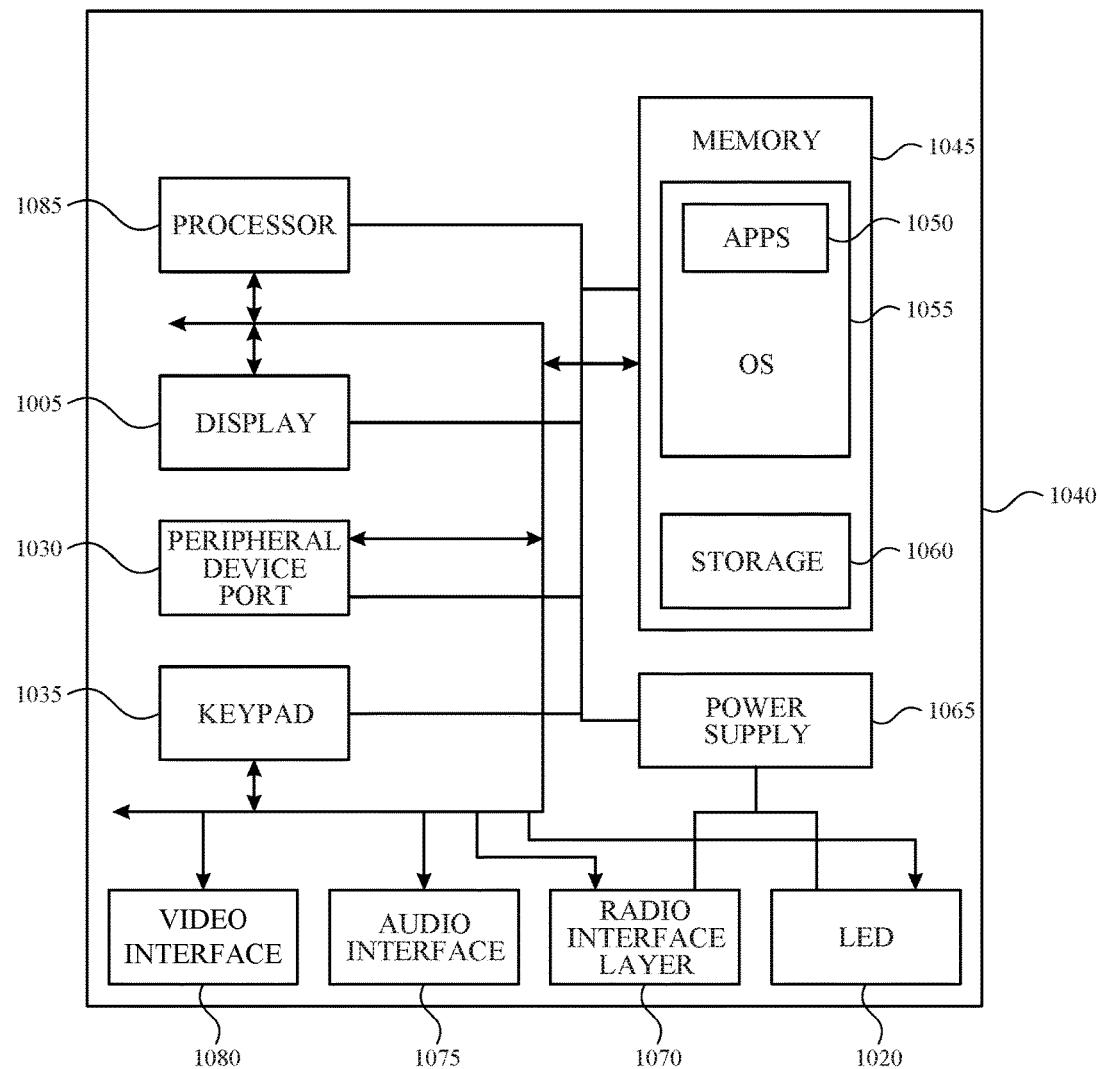

FIGS. 10A and 10B illustrate a mobile computing device 1000, for example, a mobile telephone, a smart phone, wearable computer (such as a smart watch), a tablet computer, a laptop computer, and the like, with which examples of the disclosure may be practiced. With reference to FIG. 10A, one aspect of a mobile computing device 1000 for implementing the aspects is illustrated.

In a basic configuration, the mobile computing device 1000 is a handheld computer having both input elements and output elements. The mobile computing device 1000 typically includes a display 1005 and one or more input buttons 1010 that allow an individual to enter information into the mobile computing device 1000. The display 1005 of the mobile computing device 1000 may also function as an input device (e.g., a display that accepts touch and/or force input).

If included, an optional side input element 1015 allows further input. The side input element 1015 may be a rotary switch, a button, or any other type of manual input element. In alternative aspects, mobile electronic device 1000 may incorporate more or less input elements. For example, the display 1005 may not be a touch screen in some examples. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display.

In various examples, the output elements include the display 1005 for showing a graphical user interface (GUI) (such as the one described above that provides visual representation of a determined pronunciation and may receive feedback or other such input, a visual indicator 1020 (e.g., a light emitting diode), and/or an audio transducer 1025 (e.g., a speaker). In some aspects, the mobile computing device 1000 incorporates a vibration transducer for providing an individual with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device 1000. That is, the mobile computing device 1000 can incorporate a system (e.g., an architecture) 1040 to implement some aspects. In one embodiment, the system 1040 is implemented as a "smart phone" capable of running one or more applications (e.g., browser, e-mail, calendaring, contact managers, messaging clients, games, media clients/players, content selection and sharing applications and so on). In some aspects, the system 1040 is integrated as an electronic device, such as an integrated personal digital assistant (PDA) and wireless phone.

One or more application programs 1050 may be loaded into the memory 1045 and run on or in association with the operating system 1055. Examples of the application programs include phone dialer programs, e-mail programs, personal information management (PIM) programs, word processing programs, spreadsheet programs, Internet browser programs, messaging programs, and so forth.

The system 1040 also includes a non-volatile storage area 1060 within the memory 1045. The non-volatile storage area 1060 may be used to store persistent information that should not be lost if the system 1040 is powered down.

The application programs 1050 may use and store information in the non-volatile storage area 1060, such as email or other messages used by an email application, and the like. A synchronization application (not shown) also resides on the system 1040 and is programmed to interact with a corresponding synchronization application resident on a host computer to keep the information stored in the non-volatile storage area 1060 synchronized with corresponding information stored at the host computer.

The system 1040 has a power supply 1065, which may be implemented as one or more batteries. The power supply 1065 may further include an external power source, such as an AC adapter or a powered docking cradle that supplements or recharges the batteries.

The system 1040 may also include a radio interface layer 1070 that performs the function of transmitting and receiving radio frequency communications. The radio interface layer 1070 facilitates wireless connectivity between the system 1040 and the "outside world," via a communications carrier or service provider. Transmissions to and from the radio interface layer 1070 are conducted under control of the operating system 1055. In other words, communications received by the radio interface layer 1070 may be disseminated to the application programs 1050 via the operating system 1055, and vice versa.

The visual indicator 1020 may be used to provide visual notifications, and/or an audio interface 1075 may be used for producing audible notifications via an audio transducer (e.g., audio transducer 1025 illustrated in FIG. 10A). In the illustrated embodiment, the visual indicator 1020 is a light emitting diode (LED) and the audio transducer 1025 may be a speaker. These devices may be directly coupled to the power supply 1065 so that when activated, they remain on for a duration dictated by the notification mechanism even though the processor 1085 and other components might shut down for conserving battery power. The LED may be programmed to remain on indefinitely until the individual takes action to indicate the powered-on status of the device.

The audio interface 1075 is used to provide audible signals to and receive audible signals from the individual (e.g., voice input such as described above). For example, in addition to being coupled to the audio transducer 1025, the audio interface 1075 may also be coupled to a microphone to receive audible input, such as to facilitate a telephone conversation. In accordance with examples of the present disclosure, the microphone may also serve as an audio sensor to facilitate control of notifications, as will be described below.

The system 1040 may further include a video interface 1080 that enables an operation of peripheral device 1030 (e.g., on-board camera) to record still images, video stream, and the like.

A mobile computing device 1000 implementing the system 1040 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1060.

Data/information generated or captured by the mobile computing device 1000 and stored via the system 1040 may be stored locally on the mobile computing device 1000, as described above, or the data may be stored on any number of storage media that may be accessed by the device via the radio interface layer 1070 or via a wired connection between the mobile electronic device 1000 and a separate electronic device associated with the mobile computing device 1000, for example, a server computer in a distributed computing network, such as the Internet. As should be appreciated such data/information may be accessed via the mobile computing device 1000 via the radio interface layer 1070 or via a distributed computing network. Similarly, such data/information may be readily transferred between electronic devices for storage and use according to well-known data/information transfer and storage means, including electronic mail and collaborative data/information sharing systems.

As should be appreciated, FIG. 10A and FIG. 10B are described for purposes of illustrating the present methods and systems and is not intended to limit the disclosure to a particular sequence of steps or a particular combination of hardware or software components.

Figure 11:
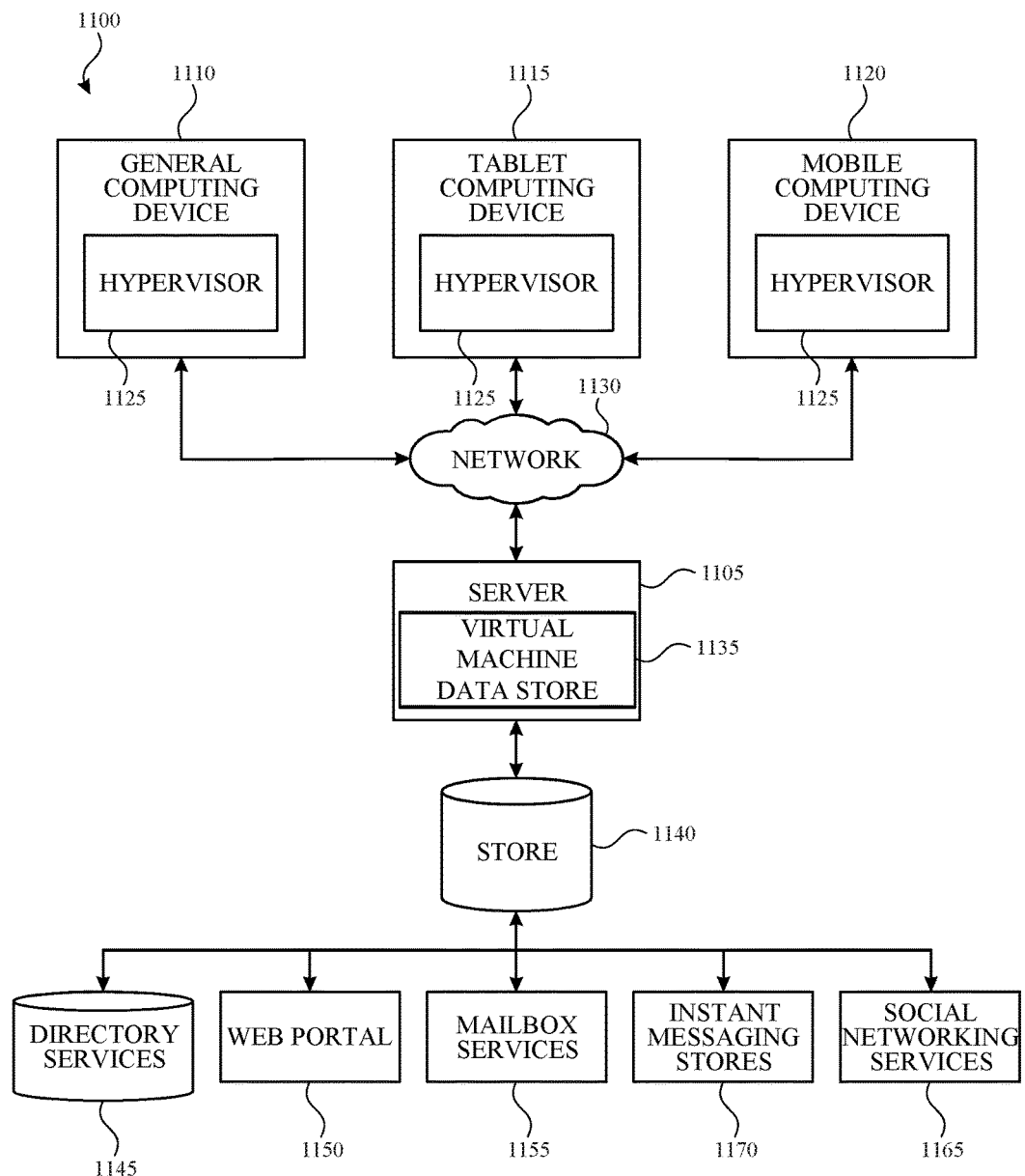
FIG. 11 is a simplified block diagram of a distributed computing system in which aspects of the present disclosure may be practiced.

FIG. 11 illustrates one aspect of the architecture of a system 1100 for providing virtualization using a plurality of computing devices. The system 1100 may include a general computing device 1110 (e.g., personal computer), tablet computing device 1115, or mobile computing device 1120, as described above. Each of these devices may include a hypervisor 1125 such as described herein.

In some aspects, each of the general computing device 1110 (e.g., personal computer), tablet computing device 1115, or mobile computing device 1120 may receive various other types of information or content that is stored by or transmitted from a directory service 1145, a web portal 1150, mailbox services 1155, instant messaging stores 1160, or social networking services 1165.

In aspects, and as described above, each computing device may have access to a virtual machine data store 1135 that is provided on a server 1105, the cloud or some other remote computing device.

By way of example, the aspects described above may be embodied in a general computing device 1110, a tablet computing device 1115 and/or a mobile computing device 1120. Any of these examples of the electronic devices may obtain content from or provide data to the store 1140.

As should be appreciated, FIG. 11 is described for purposes of illustrating the present methods and systems and is not intended to limit the disclosure to a particular sequence of steps or a particular combination of hardware or software components.

Figure 12:
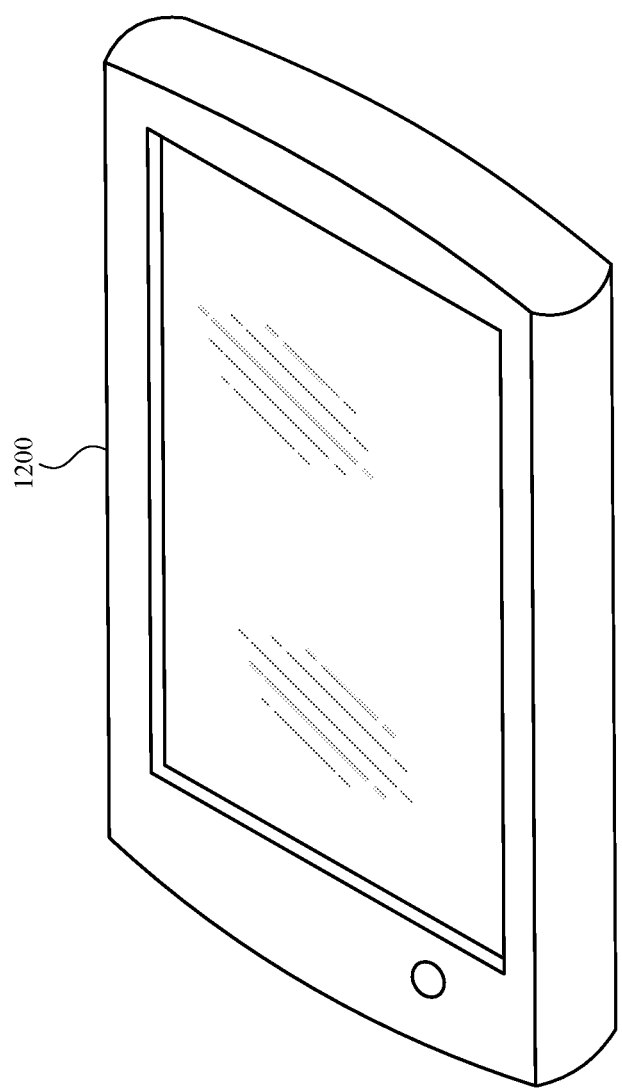
FIG. 12 illustrates a tablet computing device for executing one or more aspects of the present disclosure.

FIG. 12 illustrates an example tablet computing device 1200 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board electronic device displays or via remote display units associated with one or more electronic devices. For example, user interfaces and information of various types may be displayed and interacted with on a wall surface onto which user interfaces and information of various types are projected. Interaction with the multitude of computing systems with which examples of the invention may be practiced include, keystroke entry, touch screen entry, voice or other audio entry, gesture entry where an associated electronic device is equipped with detection (e.g., camera) functionality for capturing and interpreting gestures for controlling the functionality of the electronic device, and the like.

As should be appreciated, the figures herein FIG. 12 is described for purposes of illustrating the present methods and systems and is not intended to limit the disclosure to a particular sequence of steps or a particular combination of hardware or software components.

As will be understood from the foregoing disclosure, one aspect of the technology relates to a system comprising: at least one processor; and a memory storing instructions that, when executed by the at least one processor, perform a method for providing direct memory access. The method comprises: receiving an indication of a memory access request for one or more pages of a memory by a peripheral component interconnect express (PCI-e) device; generating a request to a memory paging processor to page-in the one or more pages; receiving, from the memory paging processor, an indication that the one or more pages are available in the memory; and providing an indication that the one or more pages are available in the memory. In an example, the indication of memory access is received from an input-output memory management unit. In another example, the method further comprises: buffering the memory access request; and when it is determined that the one or more pages are available in the memory, replaying the buffered memory access request. In a further example, providing the indication comprises providing an indication to the PCI-e device to retry the memory access request. In yet another example, the indication that the one or more pages are available in the memory is provided to the input-output memory management unit. In a further still example, the indication that the one or more pages are available in the memory is provided to the PCI-e device. In another example, the indication of the memory access request is received as a result of a virtual machine interacting with the PCI-e device.

In another aspect, the technology relates to a method for providing direct memory access for a device in use by a virtual machine. The method comprises: receiving, as a result of a transaction between the device and the virtual machine, an indication of a memory access request for one or more pages of a memory by the device; generating a request to a memory paging processor to page-in the one or more pages; receiving, from the memory paging processor, an indication that the one or more pages are available in the memory; providing an indication to the device that the one or more pages are available in the memory; and continuing the transaction based on the one or more pages available in the memory. In an example, the indication of memory access is received from an input-output memory management unit. In another example, the method further comprises buffering the memory access request, and continuing the transaction comprises replaying the buffered memory access request. In a further example, providing the indication comprises providing an indication to the PCI-e device to retry the memory access request. In yet another example, the indication that the one or more pages are available in the memory is provided to the device via the input-output memory management unit. In a further still example, the device is a peripheral component interconnect express device.

In another aspect, the technology relates to another method for providing direct memory access. The method comprises: receiving an indication of a memory access request for one or more pages of a memory by a peripheral component interconnect express (PCI-e) device; generating a request to a memory paging processor to page-in the one or more pages; receiving, from the memory paging processor, an indication that the one or more pages are available in the memory; and providing an indication that the one or more pages are available in the memory. In an example, the indication of memory access is received from an input-output memory management unit. In another example, the method further comprises: buffering the memory access request; and when it is determined that the one or more pages are available in the memory, replaying the buffered memory access request. In a further example, providing the indication comprises providing an indication to the PCI-e device to retry the memory access request. In yet another example, the indication that the one or more pages are available in the memory is provided to the input-output memory management unit. In a further still example, the indication that the one or more pages are available in the memory is provided to the PCI-e device. In another example, the indication of the memory access request is received as a result of a virtual machine interacting with the PCI-e device.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Additionally, each operation in the described methods may be performed in different orders and/or concurrently, simultaneously or substantially simultaneously with other operations.

Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system comprising:

at least one processor; and a first memory storing instructions that, when executed by the at least one processor, perform a method for providing direct memory access, comprising:

identifying a direct memory access request for one or more pages of a second memory by a peripheral device;

communicating with a memory paging processor to determine whether the requested one or more pages are unmapped in the second memory;

based on determining that the requested one or more pages are unmapped in the second memory:

storing at least a part of the direct memory access request in a third memory as a buffered the direct memory access request; and generating a request to the memory paging processor to page-in the one or more pages;

receiving, from the memory paging processor, an indication that the one or more pages are available in the second memory; and in response to the indication that the one or more pages are available in the second memory, using the buffered direct memory access request, without requiring a retry direct memory access request from the peripheral device, to resume direct memory access by the peripheral device.

2. The system of claim 1, wherein the direct memory access request is identified based on an indication received from an input-output memory management unit.

3. The system of claim 1, wherein, based on resuming the direct memory access request, a retry direct memory access request for the one or more pages of memory is not received from the peripheral device.

4. The system of claim 1, wherein the second memory and the third memory are subparts of a fourth memory.

5. The system of claim 1, wherein the peripheral device is a peripheral component interconnect express device.

6. The system of claim 1, wherein the request to the memory paging processor comprises at least one memory address associated with the one or more pages.

7. The system of claim 1, wherein the direct memory access request is identified as a result of a virtual machine interacting with the peripheral device.

8. A method for providing direct memory access for a device in use by a virtual machine, comprising:

identifying, as a result of a transaction between the device and the virtual machine, a memory access request for one or more pages of a first memory by the device;

communicating with a memory paging processor to determine whether the requested one or more pages are unmapped in the first memory;

based on determining that the requested one or more pages are unmapped in the first memory:

buffering at least a part of the memory access request in a second memory as a buffered memory access request; and generating a request to the memory paging processor to page-in the one or more pages;

receiving, from the memory paging processor, an indication that the one or more pages are available in the first memory;

in response to the indication that the one or more pages are available in the first memory, continuing the transaction based on the buffered memory access request without requiring a retry memory access request from the device.

9. The method of claim 8, wherein the memory access request is identified based on an indication received from an input-output memory management unit.

10. The method of claim 8, wherein, based on continuing the transaction, a retry memory access request for the one or more pages of memory is not received from the device.

11. The method of claim 8, wherein the first memory and the second memory are subparts of a third memory.

12. The method of claim 8, wherein the request to the memory paging processor comprises at least one memory address associated with the one or more pages.

13. The method of claim 8, wherein the device is a peripheral component interconnect express device.

14. A method for providing direct memory access, comprising:

identifying a memory access request for one or more pages of a first memory by a peripheral device;

communicating with a memory paging processor to determine whether the requested one or more pages are unmapped in the first memory;

based on determining that the requested one or more pages are unmapped in the first memory:

storing at least a part of the memory access request in a second memory as a buffered memory access request; and generating a request to the memory paging processor to page-in the one or more pages;

receiving, from the memory paging processor, an indication that the one or more pages are available in the first memory; and in response to the indication that the one or more pages are available in the first memory, using the buffered memory access request, without requiring a retry memory access request from the peripheral device, to resume the memory access request for the one or more pages of the first memory.

15. The method of claim 14, wherein the memory access request is identified based on an indication received from an input-output memory management unit.

16. The method of claim 14, wherein the first memory and the second memory are subparts of a third memory.

17. The method of claim 14, wherein the peripheral device is a peripheral component interconnect express device.

18. The method of claim 15, wherein the request to the memory paging processor comprises at least one memory address associated with the one or more pages.

19. The method of claim 18, wherein the at least one memory address is a physical memory address or a virtual memory address.

20. The method of claim 14, wherein the memory access request is identified as a result of a virtual machine interacting with the peripheral device.

* * * * *